(No Model.)

J. W. WYCKOFF & J. M. WETTON.
METAL FOR BLADES, PIPES, &c.

No. 529,990. Patented Nov. 27, 1894.

UNITED STATES PATENT OFFICE.

JAMES W. WYCKOFF AND JOHN M. WETTON, OF JACOBSVILLE, MICHIGAN.

METAL FOR BLADES, PIPES, &c.

SPECIFICATION forming part of Letters Patent No. 529,990, dated November 27, 1894.

Application filed July 14, 1893. Serial No. 480,484. (No model.)

*To all whom it may concern:*

Be it known that we, JAMES W. WYCKOFF and JOHN M. WETTON, citizens of the United States, residing at Jacobsville, county of Houghton, State of Michigan, have invented a certain new and useful Improvement in Metal for Blades, Pipes, &c.; and we declare the following to be a full, clear, and exact description of the invention, such as will enable others skilled in the art to which it appertains to make and use the same, reference being had to the accompanying drawings, which form a part of this specification.

Our invention relates to certain new and useful improvements in the construction of metal for various uses, and it consists of the matter hereinafter described and claimed and illustrated in the accompanying drawings, in which—

Figure 1:
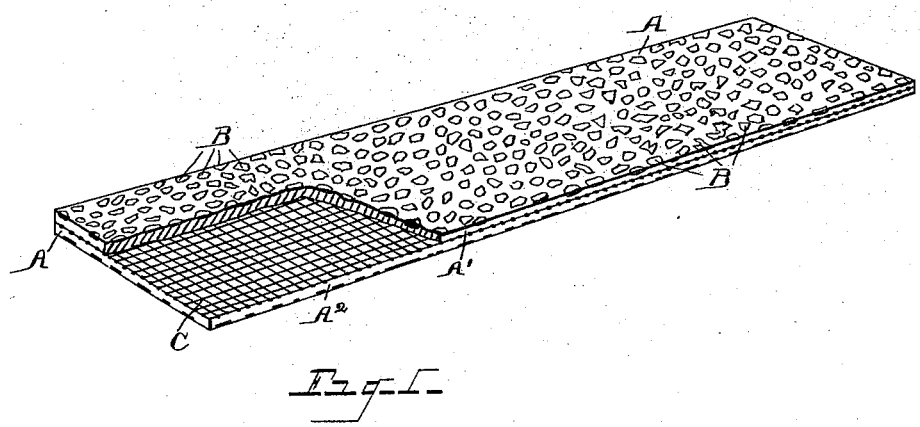
Figure 2:
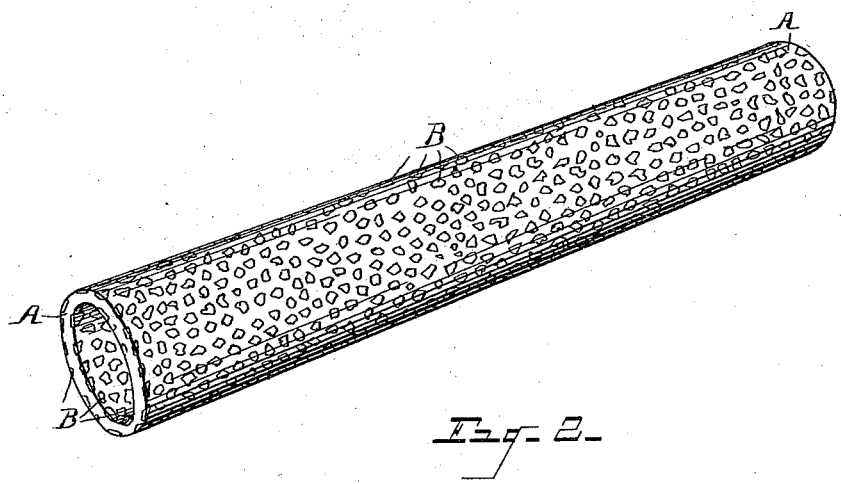

Figure 1 is a view in perspective of a piece of metal embodying our invention, showing a portion broken away. Fig. 2 is a view in perspective showing a piece of metal pipe embodying our invention.

Our invention is intended to provide a metal for cutting purposes having hard cutting particles integrally united therewith. We will describe our invention as adapted and applied for the construction of blades and pipes used for sawing, drilling or cutting stone, as an example of the uses to which the invention may be put.

It is well understood that at present, stone sawing is done by gangs of soft iron blades with sand or crushed steel washed into the cut or kerf to assist in the work. In core drilling or prospecting also it is well understood that common pipe is used for the cutting bit, and the operation of the same, with crushed steel put into the hole occasionally, does the cutting.

The object of our present invention is to provide a metal for this and analogous purposes wherein crushed steel particles of any desired size, or other forms of steel, as of wire, or other particles or metal fragments are rolled into the metal of which the saw blades or pipes are constructed, which then properly tempered give fixed cutting teeth integral with the blades or pipes. It will be apparent that the soft iron, wearing away faster than the hardened steel, leaves rugged cutting stationary teeth or projecting cutting edges to do the work formerly done by the loose sand or crushed steel employed in connection with the soft metal blade or pipe.

Blades or pipes constructed in accordance with our invention will evidently facilitate and expedite the work to be done, enabling the work to be done not only faster, but in a superior manner also and at less expense.

In the drawings A represents the soft metal or body of the blade or the pipe. B represents steel particles rolled thereinto.

We prefer to construct the metal, of which the blades or pipes are constructed in two parts, the crushed steel being preferably rolled into each of said parts. Between said parts we prefer to locate, for same purposes, steel wire, said parts with the wire therebetween being welded together and suitably tempered. This construction serves to give a most satisfactory cutting edge on the blade.

$A'$ and $A^2$ represent the two parts of the metal. In making or rolling the metal into blades or pipes, the two pieces of soft iron $A'$, $A^2$ of requisite thickness, are heated to a proper degree of heat and between them is placed the steel wire C, if employed, the steel wire preferably extending cross-wise of the parts $A'$, $A^2$ or cross-wise of the cutting edge of the plate or blade. The wire may be in the form of wire netting, the wires lying cross-wise being of steel and those running the other way or longitudinally of the blade of soft iron, the soft iron when only being used to hold the steel wires in place and at proper distances apart. The crushed steel particles may be fed into the heated metal through a hopper or otherwise, as the metal passes through the rolls, and the whole is thus welded effectually together. When tempered in any usual manner, the steel is hardened, leaving the iron soft.

While we have described our invention as applied to saws and pipes for stone cutting, we do not limit ourselves solely thereto, as our invention contemplates its use for any and all purposes other than those hereinbefore mentioned to which it may be found adapted.

We contemplate as coming within the scope of our invention either embedding only the steel particles into the blade or plate, or embedding only the steel wire therein, or embedding both into the plate, as may be desired. It will be seen that the metal so made of hard cutting particles integrally united with the soft metal may have a cutting face on one or both sides thereof as well as a cutting edge.

What we claim as our invention is—

1. A metal blade constructed in two soft metal parts, hardened wire located between said parts embedded therein, said soft metal parts with the intervening wire formed into a single integral piece, substantially as described.

2. A metal blade formed of two soft metal parts having hardened fragments or particles embedded therein, and a wire netting embedded therebetween, one series of wires in said netting being hardened and running transversely across the metal plate, substantially as described.

In testimony whereof we sign this specification in the presence of two witnesses.

JAMES W. WYCKOFF.
JOHN M. WETTON.

Witnesses:
A. H. ANDRUS,
GEORGE PFEIFER.